United States Patent
Carpenter (10) Patent No.: US 7,479,923 B2
(45) Date of Patent: Jan. 20, 2009

(54) AIRSPACE SEPARATION CONTROL AND COLLISION AVOIDANCE

(75) Inventor: Kenneth Michael Carpenter, Worcestershire (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 11/666,298

(22) PCT Filed: Nov. 7, 2005

(86) PCT No.: PCT/GB2005/004283
§ 371 (c)(1),
(2), (4) Date: Apr. 25, 2007

(87) PCT Pub. No.: WO2006/048674
PCT Pub. Date: May 11, 2006

(65) Prior Publication Data
US 2007/0290919 A1      Dec. 20, 2007

(30) Foreign Application Priority Data
Nov. 5, 2004    (GB)    ................... 0424491.9

(51) Int. Cl.
*G01S 1/00* (2006.01)
*G01S 3/02* (2006.01)

(52) U.S. Cl. ..................... 342/357.02; 342/357.08; 342/456; 342/462

(58) Field of Classification Search ............ 342/357.02, 342/357.06, 357.08, 451, 456, 457, 462; 701/207, 213, 215
See application file for complete search history.

(56) References Cited

U.S. PATENT DOCUMENTS

| 5,349,347 | A | | 9/1994 | Muller |
| 5,666,111 | A | * | 9/1997 | Servat et al. ................. 340/980 |
| 2001/0047230 | A1 | * | 11/2001 | Gremmert et al. .............. 701/4 |
| 2004/0186635 | A1 | | 9/2004 | Manfred |

FOREIGN PATENT DOCUMENTS

| DE | 19501879 | 7/1996 |
| FR | 2 815 145 | 4/2002 |

* cited by examiner

*Primary Examiner*—Dao L Phan
(74) *Attorney, Agent, or Firm*—McDonnell Boehnen Hulbert & Berghoff LLP (57) ABSTRACT

The invention provides methods for validating a position of an airborne platform, by comparing rate of change of a measure of barometric altitude with rate of change of a measure of geometric altitude. When the difference in rates of change exceeds at least one predetermined threshold an indication is provided that a threshold has been exceeded. The methods may be employed onboard an aircraft and/or at an air traffic control site, provided the aircraft transmits the necessary parameters. The comparison not only provides validation of vertical positioning information (altitude) but also horizontal positioning information. Corresponding apparatus, systems, programs for computers, and communications signals are also provided.

24 Claims, 3 Drawing Sheets

AIRSPACE SEPARATION CONTROL AND COLLISION AVOIDANCE

FIELD OF THE INVENTION

The present invention relates to air traffic management, aircraft separation provision, and mid-air collision avoidance. In particular, it relates to position monitoring and validation methods, apparatus, programs for computers, and systems. More particularly it relates to systems for monitoring and validating vertical position (altitude) and horizontal position of airborne platforms including, but not limited to fixed wing aircraft, helicopters, and airships.

BACKGROUND TO THE INVENTION

In the context of Air Traffic Management (ATM), Separation Provision is the term used to describe those functions designed to ensure that aircraft in flight maintain at all times a safe distance form each other both horizontally and vertically. Such separation provision is therefore typically the responsibility of air traffic control authorities and carried out through air traffic control centres, air traffic controllers giving directions to pilots intended to ensure safe separation.

Collision avoidance in contrast refers to those functions intended to prevent collisions between aircraft, which may arise as a result of failure of the primary separation provision provided by air traffic control.

Ideally separation provision and collision avoidance should use independent systems, but in practice both make use of pressure altitude measurements from the same source, namely from onboard pressure detection apparatus on each aircraft. This causes a weakness in the system of safety nets.

Geometric altitude measurements are achieved by reference to an external positioning system such as Global Positioning Systems (GPS). Such systems use established multi-lateration methods (i.e. multiple measurements of distances from known reference locations) to determine a receiver's position relative to multiple satellites in known positions in orbit around the earth. By simultaneous establishment of its distance from four or more. GPS satellites, a GPS receiver can establish its longitude, latitude, and altitude. Whilst GPS is one example of such a technology other systems having similar location-determining characteristics could also be used including, for example, other Global Navigation Satellite System (GNSS) such as the proposed Galileo system.

The use of pressure altitude is nevertheless at present considered necessary in separation provision systems. But Airborne Collision Avoidance Systems (ACAS) also aim to avoid collisions by ensuring that the two aircraft have different pressure altitudes at the point of closest approach. As a result, errors in pressure altitude measurements can cause both separation provision and collision avoidance to fail at the same time. This common failure mode has long been recognised and there have been actual near misses reported which were attributable to this cause.

Separation provision is likely to continue to make use of onboard pressure altitude measurements. If a change from reliance on pressure altitude to geometric altitude were to be made, then in practice this would effectively have to take place globally at substantially the same time, otherwise the likelihood of accidents and near-misses would increase since aircraft sharing the same airspace would base altitude readings on quite different bases. Furthermore, it is understood that aircraft fly more naturally on a trajectory following constant pressure than following constant geometric altitude, so that maintaining pressure altitude in flight has particular benefits.

Pressure altimeters are also required for independent collision avoidance: independent being in the sense that the measurements do not depend upon systems external to the aircraft itself. As a result, even if a time arrived when all aircraft had geometric altitude sensors and operators wished to switch to using geometric altitude readings and dispense with expensive pressure altimeters for that purpose, the pressure altimeters would most likely still be required to support the requirements of independent collision avoidance.

A further problem would arise if geometric altitude were used for separation control and pressure altitude for collision avoidance in that where some, but not all, aircraft in a given region lost contact with the external infrastructure necessary to determine geometric altitude, some aircraft would then be able only to transmit pressure altitude. But those pressure altitude readings would be neither readily nor safely comparable with geometric altitude readings transmitted by those aircraft still able to determine and transmit that measure. As a result, all aircraft would still have to transmit the pressure altitude reading which would be the only measure common to both sets of aircraft in the event of loss of contact with the external reference sources necessary to compute geometric altitude. There is therefore little incentive to switch from using pressure altitude to using geometric altitude as the principal or basis for altitude transmissions, and still less to use it as the only basis.

Any collision avoidance system that made no attempt to ensure that two aircraft are at different pressure altitudes at closest approach would quickly fall into disrepute. However, such collision avoidance systems could nevertheless supplement use of the pressure altitude separation with geometric altitude separation, seeking to ensure that the two aircraft are also at different geometric altitudes at closest approach. Whilst this would in principle be possible and would meet the requirement for independence, it would involve a significant departure from established practice and designs underlying existing and proposed ACAS systems.

As a result it would be valuable to provide an improved means of determining levels of confidence associated with position measurements, including altitude measurements and especially pressure altitude measurements.

SUMMARY OF THE INVENTION

According to a first aspect of the present invention there is provided a method of analysing position data relating to an airborne platform, the method comprising:
  providing an indication of reliability of position data relating to the airborne platform responsive to a comparison between one or more predetermined thresholds and the difference between a measure of rate of change of pressure altitude and a measure of rate of change of geometric altitude.

In some embodiments the indication is provided responsive to which of the at least one thresholds has been exceeded. Such indications may therefore also be indicative of which threshold has been passed.

In some embodiments the indication is indicative of which of the at least one thresholds has been exceeded.

In some embodiments the difference is calculated responsive to a measure of at least one of the airspeed of the airborne platform and the crosswind experienced by the airborne platform.

In some embodiments the comparison is made based on the relationship:

$$\frac{T}{T^*}\omega \approx w + \frac{f}{g}s\sigma$$

in which:
T is the air temperature,
T* is the air temperature in the standard atmosphere, a function of pressure,
ω is the rate of change of pressure altitude,
w is the rate of change of geometric altitude
ƒ is the Coriolis parameter, a function of latitude
g is gravitational acceleration
s is the air speed of the aircraft, and
σ is the crosswind experienced by the aircraft.

In some embodiments the method is performed onboard the airborne platform.

In some embodiments the indication comprises an indication of a reduction in reliability of position information relating to the airborne platform.

In some embodiments the position information comprises an indication of a reduction in reliability of horizontal positioning information relating to the airborne platform. As a result a degree of confidence in the longitude and latitude information reported may be established.

In some embodiments the position information comprises an indication of a reduction in reliability of vertical positioning information relating to the airborne platform. As a result a degree of confidence in the altitude information reported may be established.

In some embodiments the indication is transmitted from the airborne platform.

In some embodiments the indication comprises an aural or visual alarm indication.

In some embodiments the indication is an alarm to a person onboard the airborne platform.

In some embodiments the airborne platform is an aircraft.

The invention is also directed to apparatus arranged to carry out the steps of the methods of the invention, and methods for operating such apparatus.

In particular, according to a second aspect of the present invention there is provided an apparatus for validating a position of an airborne platform, the apparatus comprising:
  first apparatus for determining a measure of rate of change of barometric altitude of the airborne platform;
  second apparatus for determining a measure of rate of change of geometric altitude of the airborne platform;
  third apparatus for providing an indication when the difference in measures of rates of change exceeds at least one predetermined threshold.

According to a third aspect of the present invention there is provided a transmitter arranged to transmit position information relating to an airborne platform, the transmitter comprising apparatus according to the second aspect.

According to a fourth aspect of the present invention there is provided a transponder comprising at least one of apparatus according to the second aspect and a transmitter according to the third aspect.

According to a fourth aspect of the present invention there is provided an airborne platform comprising at least one of apparatus according to second aspect, a transmitter according to third aspect, and a transponder according to fourth aspect.

According to a fifth aspect of the present invention there is provided an air traffic control system comprising at least one of apparatus according to second aspect and a transmitter according to the third aspect.

According to a sixth aspect of the present invention there is provided a method of controlling the flight path of an airborne platform, the method comprising controlling the airborne platform responsive to an indication that a difference between a rate of change of pressure altitude and a rate of change of geometric altitude associated with the airborne platform has exceeded at least one predetermined threshold.

In some embodiments the airborne platform is controlled by crew onboard the airborne platform.

According to a seventh aspect of the present invention there is provided a method of air traffic control comprising directing the flight path of an airborne platform responsive to an indication that the difference between a rate of change of pressure altitude and a rate of change of geometric altitude associated with the airborne platform has exceeded at least one predetermined threshold.

In some embodiments the airborne platform transmits the indication that the difference between a rate of change of pressure altitude and a rate of change of geometric altitude associated with the airborne platform has exceeded at least one predetermined threshold.

In some embodiments the rate of change of difference between pressure altitude and geometric altitude associated with the airborne platform is calculated remotely from the airborne platform.

In some embodiments the indication is transmitted to the airborne platform.

According to an eight aspect of the present invention there is provided a method of analysing position data relating to an airborne platform substantially as described herein with reference to the accompanying figures.

The inventions also directed to communications signals employed to convey position and position accuracy information in accordance with the present invention. The invention is also directed to those methods which generate and act upon such signals.

In particular, according to a ninth aspect of the present invention there is provided a communications signal comprising data relating to airborne platform position, the signal comprising an indication that a difference between barometric altitude rate of change and geometric altitude rate of change has exceeded at least one predetermined threshold.

The invention is also directed to programs for computers (whether as software or firmware, chip layout software, or source code or object code) for performing the methods of the invention. The invention is also directed to computers programmed by means of such programs (and which form apparatus in the sense of the second aspect of the invention).

In particular, according to a tenth aspect of the present invention there is provided a program for a computer, the program being arranged to perform the steps of:
  providing an indication of reliability of position data relating to the airborne platform responsive to a comparison between one or more predetermined thresholds and the difference between a measure of rate of change of pressure altitude and a measure of rate of change of geometric altitude.

The preferred features may be combined as appropriate, as would be apparent to a skilled person, and may be combined with any of the aspects of the invention. Other advantages of the invention, beyond the examples indicated above, will also be apparent to the person skilled in the art.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF THE INVENTION

Figure 1:
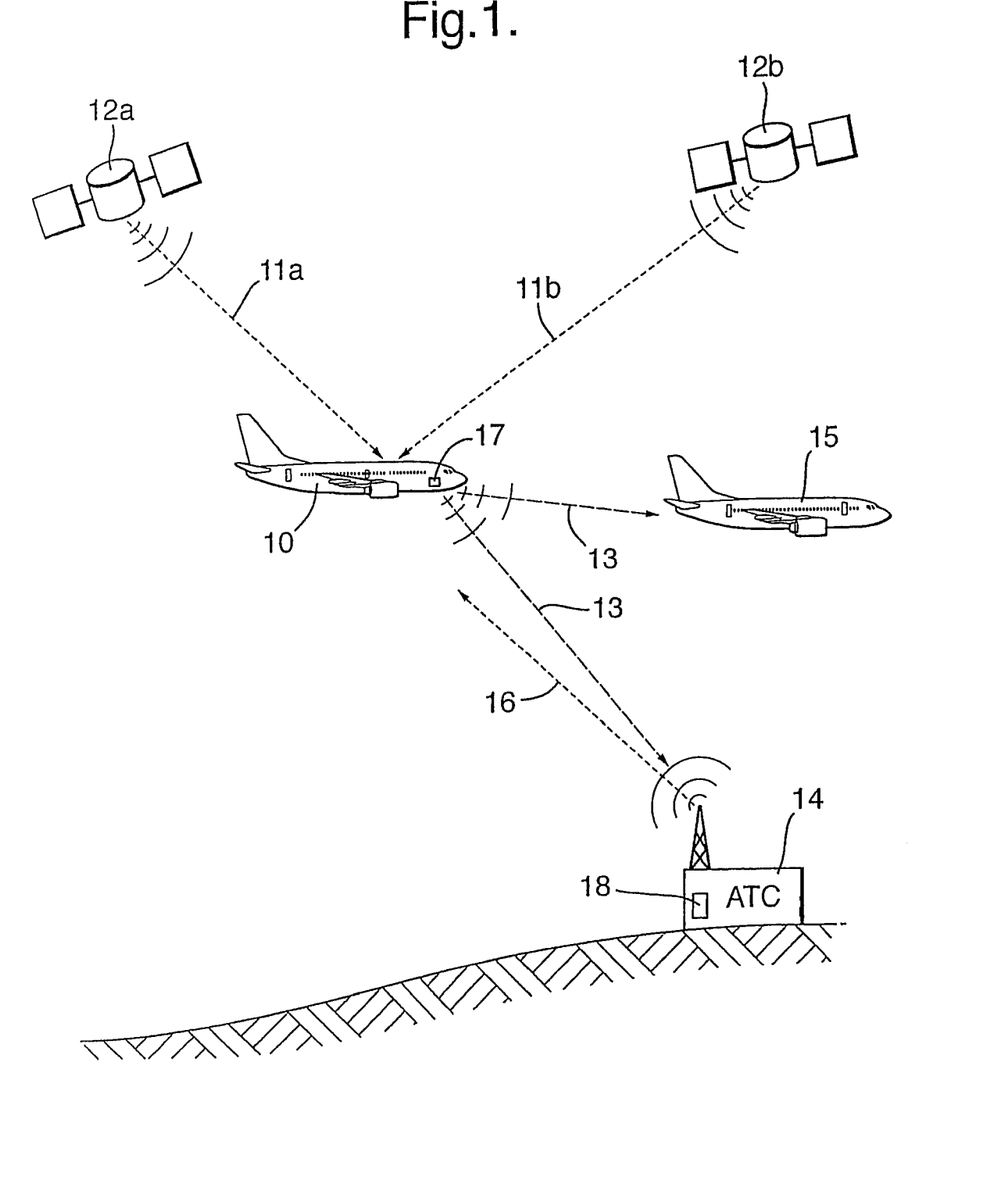
FIG. 1 shows first embodiment of a system in accordance with the present invention.

Referring now to FIG. 1, an aircraft can determine its altitude by means of two methods: by multilateration with reference to signals 11a-11b received from external reference points such as GPS-enable satellites 12a-12b to derive a measure of geometric altitude, or by reference to local barometric pressure by means of an on-board sensor (not shown) to derive a measure of pressure altitude. The aircraft can then broadcast 13 position information derived form those measurements, the signals being receivable both by Air Traffic Management systems (e.g. at an Air Traffic Control centre 14 or by receivers aboard other neighbouring aircraft 15. As noted above aircraft can, and may be required to by regulations or agreed information broadcast standards, transmit both geometric altitude and pressure altitude information. Future Air Traffic Control centres may use this information to instruct 16 air traffic movements based on the transmitted information.

Figures 2A, 2B, 2C:
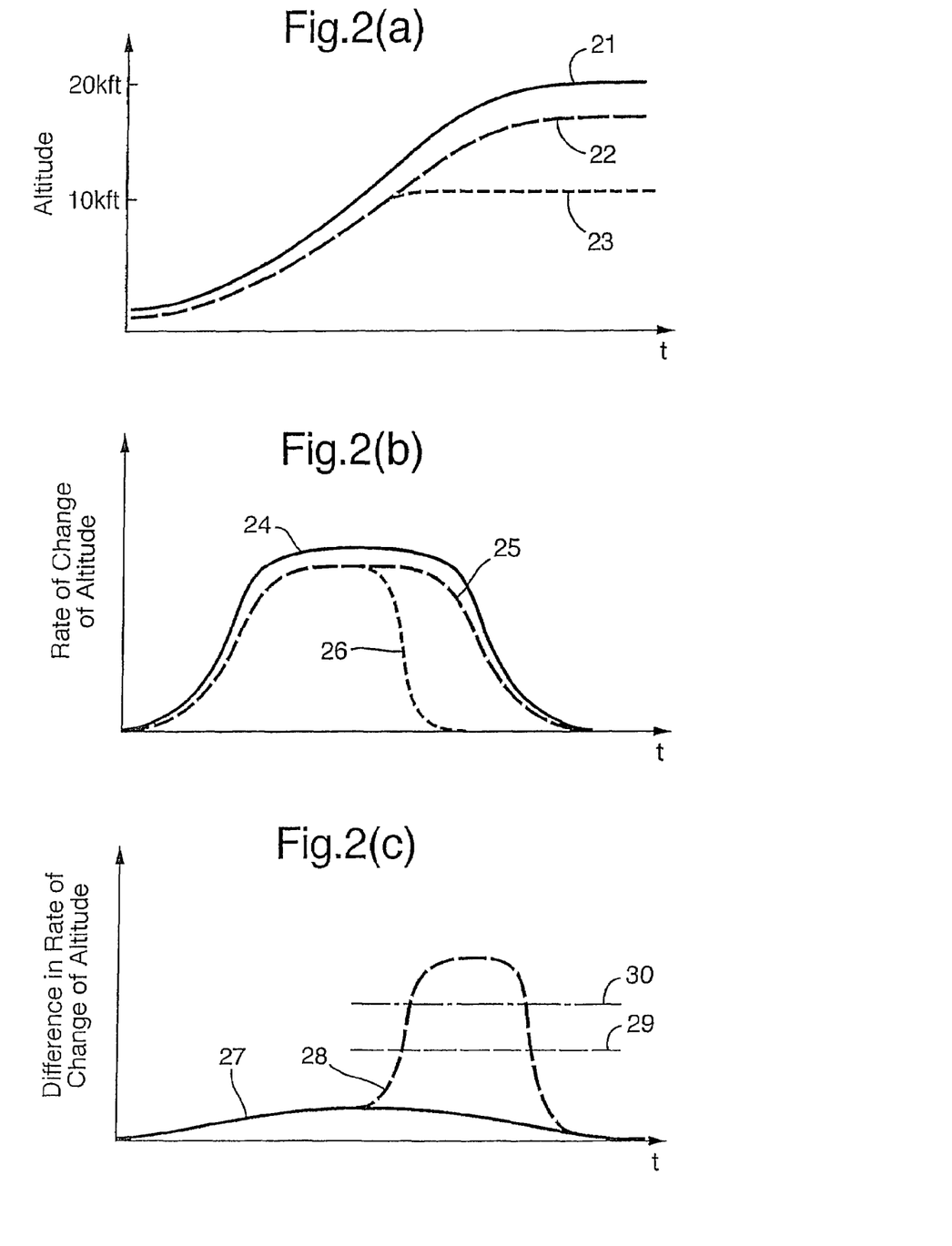
FIG. 2(a) shows a schematic graph comparing pressure altitude and geometric altitude over time.
FIG. 2(b) shows a schematic graph showing the difference between pressure altitude and geometric altitude over time.
FIG. 2(c) shows a schematic graph showing the difference in rates of change of pressure altitude and geometric altitude over time.

Referring now to FIG. 2(a), geometric altitude values 21 and pressure altitude values 22 derived in this way can differ at any given time by thousands of feet (equivalent to a pressure variation in the order of 60 mb at the earth's surface, and significantly more at higher altitudes). Thus, simple, direct comparison of the two altitude values does not provide a useful or practical test for their validity.

However, and referring now to FIG. 2(a), if both altitudes measures are tracked over time, it is possible to derive the rate of change 24 of geometric altitude and the rate of change 25 of pressure altitude. The difference between those rates of change should normally evolve without discontinuity since, under normal operating conditions, the rate of change 24 of geometric altitude and the rate of change 25 of pressure altitude should track each other more closely than do the respective altitude values 21-22 themselves.

FIG. 2(c) shows the corresponding difference 27 between the rate of change of geometric altitude and pressure altitude.

Referring to FIGS. 2(a), 2(b) and 2(c), where an abnormal discrepancy between geometric altitude 21 and pressure altitude 23 occurs (in the case shown where pressure altitude becomes fixed at a given altitude), this is reflected in the rate of change of pressure altitude dropping 26 to zero, thereby widening the difference between pressure altitude rate and geometric altitude rate (which continues to rise) thereby leading to an increase in the difference of the rate of change. The corresponding effect on the difference 28 of the two rates is significant relative to normal evolution of the difference 27.

One or more thresholds 29, 30 may be set which are used to trigger an indication or alarm to show that the difference has passed those pre-set limits. Suitable values for those thresholds may vary according to circumstances and may be determined by empirical means. In practice thresholds may also be set in common regulatory requirements imposed on aircraft operators.

Extreme values for the numerical difference in altitude rates would be in the order of 70 fpm for aircraft which are flying notionally "level", and around 300 fpm for an aircraft climbing at 1500 fpm. Further values may be obtained by empirical means. However, these differences are significantly lower than the errors and noise that inevitably occur when tracking pressure altitude itself: for example, an error of 500 fpm when an aircraft is accelerating vertically is normal, and differences between a tracked steady rate of climb and the actual instantaneous vertical rate can be in the order of 200-300 fpm.

So for example, should the geometric vertical rate be reported or diagnosed as +1000 fpm and the pressure vertical rate as −1000 fpm, it is be clear that both cannot be correct. In this particular case it may be reasonable that there is a Gilham encoding error; indeed, it may be possible to diagnose, in real time, the pin that is stuck.

By definition:

$$\omega = \frac{dh(p)}{dt} = \frac{\partial h}{\partial p} \cdot \frac{dp}{dt} = -\frac{1}{\rho * g} \cdot \frac{dp}{dt} \quad (1)$$

In which:
ω is the rate of change of pressure altitude
p is the barometric pressure
h(p) is the pressure altitude, a function of pressure, p
ρ* is the air density at height h(p) in the standard atmosphere, also a function of pressure
g is gravitational acceleration
But it is also known that:

$$\frac{dp}{dt} = \frac{\partial p}{\partial t} + u\frac{\partial p}{\partial x} + v\frac{\partial p}{\partial y} \quad (2)$$

in which:
u, v are the components of the aircraft's horizontal velocity
The hydrostatic approximation gives:

$$\frac{\partial p}{\partial t} = -\rho g w \quad (3)$$

in which:
ρ is the air density
w is the rate of change of geometric altitude

Geostrophic wind velocity is the wind velocity that, through the Coriolis force, exactly balances the pressure gradient. Geostrophic wind velocity approximates actual wind velocity and applying the definition of the geostrophic wind gives $$\frac{\partial p}{\partial x} = f\rho v_g \quad (4)$$

and

-continued $$\frac{\partial p}{\partial y} = -f\rho u_g \quad (5)$$

in which:
   $f$ is the Coriolis parameter, a function of latitude ($\approx 10^{-4}$ s$^{-1}$ at 45° N, $-10^{-4}$ s$^{-1}$ at 45° S)
   $u_g$, $v_g$ are the components of the geostrophic wind velocity
   From this it follows that the rates of change, $\omega$, of pressure altitude and the rate of change, w, of geometric altitude are related by:

$$-\rho^* g \omega = -\rho g w + u f \rho v_g - v f \rho u_g \quad (6)$$

Further observing that:

$$\frac{T}{T^*} = \frac{\rho^*}{\rho} \quad (7)$$

in which:
   T is the air temperature,
   T* is the air temperature in the standard atmosphere, a function of pressure,
   Consequently the geometric and pressure vertical rates of change of altitude are related as follows:

$$\frac{T}{T^*}\omega = w + \frac{f}{g}(vu_g - uv_g) \quad (8)$$

It is noted that this formulae depends upon the values of the components of the aircraft's horizontal velocity and also upon the components of the geostrophic wind velocity which are not always readily available.

However the present inventors have also recognised that, for practical purposes, the following useful approximation holds:

$$s\sigma \approx (vu_g - uv_g) \quad (9)$$

in which:
   s is the air speed of the aircraft, and
   $\sigma$ is the crosswind experienced by the aircraft.
   And, substituting this into equation (8) above, gives the following approximation:

$$\frac{T}{T^*}\omega \approx w + \frac{f}{g}s\sigma \quad (10)$$

So, for example, for an aircraft flying "level" directly across the jet stream, the difference between pressure vertical rate and geometrical vertical rate could be as large as about 70 feet per minute (fpm); and for an aircraft climbing at 1500 fpm well away from any pressure gradient, the difference could be as large as 300 fpm.

Although these differences between geometric and pressure altitude rates do exist, they are nevertheless small enough for direct comparison of the two rates to remain useful. Indeed the approximation has the additional benefit that all of the terms in the right hand side of the approximation (formula 10)—two vertical rates, temperature, airspeed, and crosswind—are capable of direct measurement onboard aircraft and indeed many existing aircraft are already fitted with relevant sensors so that no additional sensors might be required to be fitted in those cases. The approximation can therefore be used to greatly improve the utility of the validation method based on tracking geometric altitude rate against pressure altitude rate.

The errors involved in approximation (10) (i.e. the substitution of the actual wind for the geostrophic wind) is not expected to exceed a difference of about 10 fpm.

Based on this principle, various validation tests on the reported pressure altitude may be applied. For example:
   Track both pressure altitude and geometric altitude, perhaps using reports of altitude rate, and compare the geometric and pressure altitude rates given by these tracks. A problem is indicated when the difference between the two rates reaches or passes a predetermined threshold value. In general, multiple threshold values may be set so as to provide an indication of the degree of divergence of the rates depending on which thresholds are reached or passed.
   A second is to use the diagnosed geometric altitude rate in the pressure altitude tracker, and to compare the pressure altitude indicated by the tracker with the pressure altitude reports.

Having a diagnosed geometric altitude rate, this can be used to infer pressure altitude rate by using equation (8) or (10). The inferred pressure altitude rate can be used to track pressure altitude in time from a reliable pressure altitude estimate. At some later time the pressure altitude indicated by the tracker can be compared with the pressure altitude reports. If the tracked and reported values are in reasonable agreement (within defined bounds) the reported pressure altitude can be used as the latest reliable altitude reference point. If they are not in agreement then a problem can be flagged.

Clearly neither method excludes use of the other so that both may be employed in parallel.

From the ACAS perspective, the priority is to ensure that pressure altitude is validated and this can be achieved with little or no change to existing ACAS principles. Pressure altitude may still be used, as in known systems, but with the added benefit of being able to validate the pressure altitude measurements with respect to geometric altitude measurements. If an ACAS equipped aircraft is also equipped with Airborne Separation Assistance System (ASAS), both systems may use the same validated pressure altitude. It is not important precisely where in the various systems the validation function is located.

An ACAS-equipped aircraft may acquire the geometric altitude information either via ADS-B or by other means, for example by interrogation and reply. The ADS-B MASPS specify that geometric altitude, pressure altitude, and altitude rate (either geometric rate or pressure rate) should all be broadcast. Implementing ADS-B MASPS requirements would make it possible to track pressure altitude and geometric altitude, and thus validate the pressure altitude, as described above.

It has been further recognised that—unlike existing and proposed systems in which both pressure altitude and geometric altitude are transmitted by aircraft and any cross-validation of the data is subsequently performed by a receiving aircraft or air traffic control stations (whether airborne or ground-based)—validation of the readings can be performed onboard the transmitting aircraft with additional significant benefits. The include the ability to indicate to flight crew that a discrepancy outside pre-set threshold has arisen between the pressure and altitude readings and hence their displayed values should be treated with additional caution. If it is computed onboard, the fact that a discrepancy exists can be broadcast to surrounding aircraft and ATC rather than their having to each calculate that discrepancy themselves. Both parties may of course perform the validation for additional safety and each may make use of differing threshold values according to need.

When a comparison determines that positioning information may be suspect, an aircraft may optionally suppress further transmission of the suspect data, reverting to manual instruction from air traffic control rather than continue to broadcast potentially erroneous location information or set a flag to indicate the lack of integrity of the data.

Figure 3:
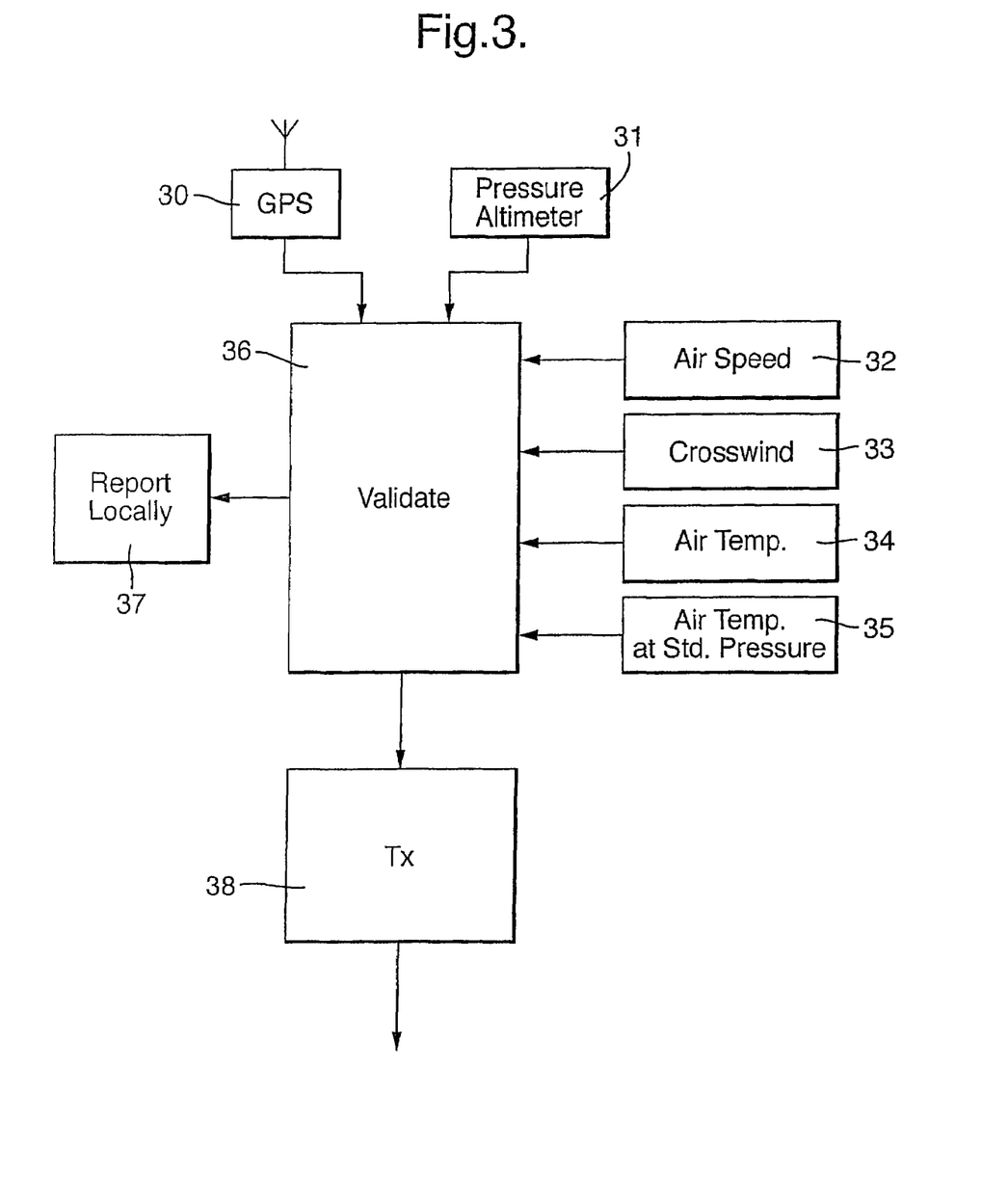
FIG. 3 shows an apparatus arrangement in accordance with the present invention.

Referring now to FIGS. 1 and 3, suitable apparatus 17 to implement the method comprises avionics software and/or hardware receiving the following input data:
- geometric altitude 30;
- pressure altitude 31;
- air speed 32;
- crosswind 33 (measured directly or inferred from airspeed and ground speed, if available).
- air temperature 34, if available; and
- air temperature in the standard atmosphere 35

Geometric altitude rate, if available, may also be input. Use of pressure altitude rate might also be considered, particularly if it is based on inertial sensors that are independent of the pressure measurement.

The input data are used to track pressure altitude, pressure altitude rate, geometric altitude and geometric altitude rate. Using these trackers, an instantaneous prediction is made of the pressure altitude, and this is used to verify the credibility of the most recent pressure altitude report. The rate of change of the difference between pressure altitude and geometric altitude should be small, the meaning of "small" being indicated by Approximation 9, which can be used in the detailed design of the tests.

When all the information is available validation 36 may proceed. Approximation 10 may be applied to derive the expected rate of change of pressure altitude based upon rate of change of geometric altitude (or vice versa). This can then be compared with actual changes in the pressure altitude to a greater precision than is achievable without the additional information, and thus to a greater precision than is likely to be achievable on any platform other than the aircraft making the pressure report unless of course all the necessary input data is transmitted continually by that aircraft. The resulting assessment of validity of the pressure altitude and geometric altitude measurements may be provided locally 37 and/or transmitted 38 to air traffic control and neighbouring aircraft.

Where the necessary inputs are available remotely—for example by broadcast 13 of the basic data from the aircraft—the checks can be performed remotely on equipment 18 located in, for example an air traffic control centre. Indeed, where an aircraft is not equipped to perform the check itself but nevertheless transmits all necessary data to enable comparison to be made remotely, the results of that comparison may be transmitted 16 back to the aircraft in question, and to any other aircraft, to inform the flight crew of any potential problems detected.

It has also been recognised that the comparison of altitude rates of change can be used more widely in the validation of flight data.

Specifically, when pressure altitude rate and geometric altitude data is compared and the comparison reveals that they are not consistent, both values for altitude are effectively rendered suspect. The two values might have known and rather different values of integrity, and it might be possible to prefer one of the altitude values on rational grounds. However, the integrity of both measurements should be considered reduced and neither value should be trusted as much as it would have been before the comparison.

Conversely, when the comparison suggests the values are mutually consistent with the predetermined limits, both the geometric altitude and the pressure altitude are effectively validated. Both altitude values can be treated as having higher integrity than they would have done before the test was carried out.

Thus comparison also provides mutual validation of both pressure altitude and geometric altitude. Now the most likely source for the geometric altitude data is GPS (or for example GNSS, either with or without augmentation). Consequently, when the geometric altitude is called in to question, the horizontal position (latitude and longitude) of the aircraft derived from the same multilateration data as the geometric altitude must similarly be called into doubt; when the geometric altitude is found consistent with pressure altitude, the horizontal position (latitude and longitude) of the aircraft are implicitly confirmed to the same degree. As a result, the comparison of geometric altitude and pressure altitude data may be also used to validate horizontal position data. Thus the comparison of geometric and pressure altitude described above can be used to validate GPS position data as a whole.

As will be apparent to the person skilled in the art, implementation of the invention may be achieved either through dedicated circuitry or through programming of a suitable programmable device (e.g. microchip or computer).

Furthermore, computer software and/or data representations may clearly be employed in the design and production of hardware devices or other apparatus embodying the invention and it is to be understood that such programs also fall within the scope of the present invention insofar as they embody a representation of the methods described herein.

Any range or device value given herein may be extended or altered without losing the effect sought, as will be apparent to the skilled person for an understanding of the teachings herein.

The invention claimed is:

1. A method of analysing position data relating to an airborne platform, the method comprising:
providing an indication of reliability of position data relating to the airborne platform responsive to a comparison between one or more predetermined thresholds and the difference between a measure of rate of change of pressure altitude and a measure of rate of change of geometric altitude
in which the comparison is made based on the relationship:

$$\frac{T}{T^*}\omega \approx w + \frac{f}{g}s\sigma$$

in which:
T is the air temperature,
T* is the air temperature in the standard atmosphere,
ω is the rate of change of pressure altitude,
w is the rate of change of geometric altitude
f is the Coriolis parameter
g is gravitational acceleration
s is the air speed of the aircraft, and
σ is the crosswind experienced by the aircraft.

2. A method according to claim 1 in which the indication is provided responsive to which of the at least one thresholds has been exceeded.

3. A method according to claim 1 in which the indication is indicative of which of the at least one thresholds has been exceeded.

4. A method according to claim 1 in which the difference is calculated responsive to a measure of at least one of the airspeed of the airborne platform and the crosswind experienced by the airborne platform.

5. A method according to claim 1, in which the method is performed onboard the airborne platform.

6. A method according to claim 1 in which the indication comprises an indication of a reduction in reliability of position information relating to the airborne platform.

7. A method according to claim 6 in which the position information comprises an indication of a reduction in reliability of horizontal positioning information relating to the airborne platform.

8. A method according to claim 7 in which the position information comprises an indication of a reduction in reliability of vertical positioning information relating to the airborne platform.

9. A method according to claim 1 in which the indication is transmitted from the airborne platform.

10. A method according to claim 1 in which the indication comprises an aural or visual alarm indication.

11. A method according to claim 1 in which the indication is an alarm to a person onboard the airborne platform.

12. A method according to claim 1 in which the airborne platform is an aircraft.

13. Apparatus for validating a position of an airborne platform, the apparatus comprising:
first apparatus for determining a measure of rate of change of barometric altitude of the airborne platform;
second apparatus for determining a measure of rate of change of geometric altitude of the airborne platform;
third apparatus for providing an indication responsive to a comparison between the difference in measures of rates of change and at least one predetermined threshold
in which the comparison is made based on the relationship:

$$\frac{T}{T^*}\omega \approx w + \frac{f}{g}s\sigma$$

in which:
T is the air temperature,
T* is the air temperature in the standard atmosphere,
ω is the rate of change of pressure altitude,
w is the rate of change of geometric altitude
ƒ is the Coriolis parameter
g is gravitational acceleration
s is the air speed of the aircraft, and
σ is the crosswind experienced by the aircraft.

14. A transmitter arranged to transmit position information relating to an airborne platform, the transmitter comprising at least one apparatus according to claim 13.

15. A transponder comprising a transmitter according to claim 14.

16. An airborne platform comprising at least one apparatus for validating a position of an airborne platform, the apparatus including:
first apparatus for determining a measure of rate of change of barometric altitude of the airborne platform; second apparatus for determining a measure of rate of change of geometric altitude of the airborne platform; and third apparatus for providing an indication responsive to a comparison between the difference in measures of rates of change and at least one predetermined threshold,
in which the comparison is made based on the relationship:

$$\frac{T}{T^*}\omega \approx w + \frac{f}{g}s\sigma$$

in which;
T is the air temperature,
T* is the air temperature in the standard atmosphere,
ω is the rate of change of pressure altitude,
w is the rate of change of geometric altitude
ƒ is the Coriolis parameter
g is gravitational acceleration
s is the air speed of the aircraft, and
σ is the crosswind experienced by the aircraft
a transmitter arranged to transmit position information relating to an airborne platform, and
a transponder according to claim 15.

17. An air traffic control system comprising at least one apparatus for validating a position of an airborne platform, the apparatus including:
first apparatus for determining a measure of rate of change of barometric altitude of the airborne platform; second apparatus for determining a measure of rate of change of geometric altitude of the airborne platform; and third apparatus for providing an indication responsive to a comparison between the difference in measures of rates of change and at least one predetermined threshold,
in which the comparison is made based on the relationship:

$$\frac{T}{T^*}\omega \approx w + \frac{f}{g}s\sigma$$

in which:
T is the air temperature,
T* is the air temperature in the standard atmosphere,
ω is the rate of change of pressure altitude,
w is the rate of change of geometric altitude
ƒ is the Coriolis parameter
g is gravitational acceleration
s is the air speed of the aircraft, and
σ is the crosswind experienced by the aircraft
and a transmitter according to claim 14.

18. A method of controlling the flight path of an airborne platform, the method comprising controlling the airborne platform responsive to a comparison between a difference between a rate of change of pressure altitude and a rate of change of geometric altitude associated with the airborne platform and at least one predetermined threshold
in which the comparison is made based on the relationship:

$$\frac{T}{T^*}\omega \approx w + \frac{f}{g}s\sigma$$

in which;
T is the air temperature,
T* is the air temperature in the standard atmosphere,
ω is the rate of change of pressure altitude,
w is the rate of change of geometric altitude
ƒ is the Coriolis parameter
g is gravitational acceleration s is the air speed of the aircraft, and σ is the crosswind experienced by the aircraft.

19. A method according to claim 18 in which the airborne platform is controlled by crew onboard the airborne platform.

20. A method of air traffic control comprising directing the flight path of an airborne platform responsive to a comparison between the difference between a rate of change of pressure altitude and a rate of change of geometric altitude associated with the airborne platform and at least one predetermined threshold in which the comparison is made based on the relationship:

$$\frac{T}{T^*}\omega \approx w + \frac{f}{g}s\sigma$$

in which:

T is the air temperature,

T* is the air temperature in the standard atmosphere,

ω is the rate of change of pressure altitude, w is the rate of change of geometric altitude $f$ is the Coriolis parameter g is gravitational acceleration s is the air speed of the aircraft, and σ is the crosswind experienced by the aircraft.

21. A method according to claim 20 in which the airborne platform transmits an indication that the difference between a rate of change of pressure altitude and a rate of change of geometric altitude associated with the airborne platform has exceeded at least one predetermined threshold.

22. A method according to claim 20 in which the rate of change of difference between pressure altitude and geometric altitude associated with the airborne platform is calculated remotely from the airborne platform.

23. A method according to claim 22 in which an indication generated responsive to the comparison is transmitted to the airborne platform.

24. A program for a computer, the program being arranged to perform the steps of:

providing an indication of reliability of position data relating to the airborne platform responsive to a comparison between one or more predetermined thresholds and the difference between a measure of rate of change of pressure altitude and a measure of rate of change of geometric altitude in which the comparison is made based on the relationship:

$$\frac{T}{T^*}\omega \approx w + \frac{f}{g}s\sigma$$

in which:

T is the air temperature,

T* is the air temperature in the standard atmosphere,

ω is the rate of change of pressure altitude, w is the rate of change of geometric altitude $f$ is the Coriolis parameter g is gravitational acceleration s is the air speed of the aircraft, and σ is the crosswind experienced by the aircraft.

\* \* \* \* \*